March 3, 1942.  A. W. KRAUSE  2,275,368
TEMPERATURE CONTROL SYSTEM
Filed Aug. 27, 1937
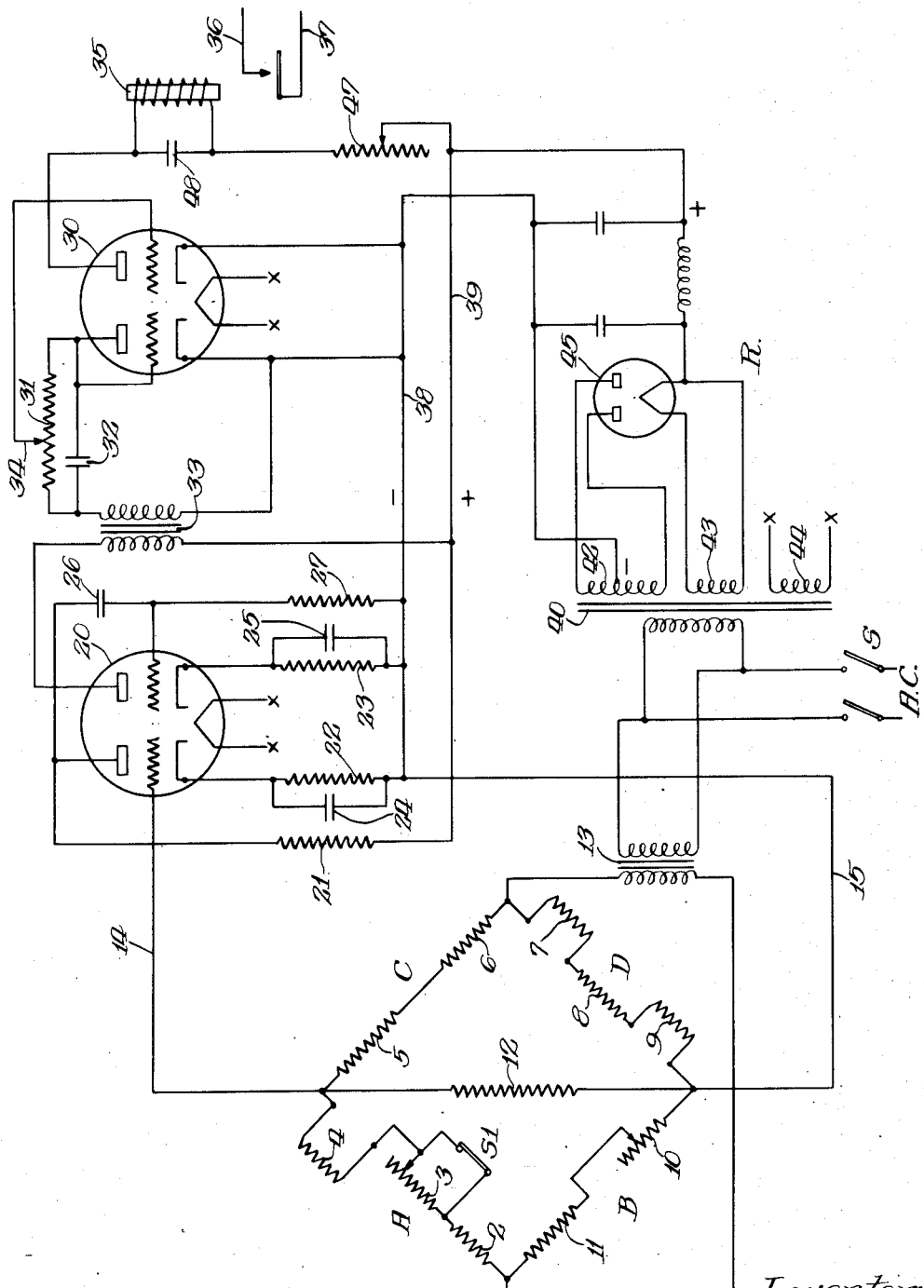
Inventor:
Albert W. Krause,
By Richardson and Auer
Atty's.

Patented Mar. 3, 1942

2,275,368

UNITED STATES PATENT OFFICE 2,275,368

TEMPERATURE CONTROL SYSTEM

Albert W. Krause, Evanston, Ill.

Application August 27, 1937, Serial No. 161,203

7 Claims. (Cl. 236—78)

The present invention relates in general to temperature control systems, and more in particular to a system of this character which is used for controlling the boiler temperature in a heating system. The invention is characterized by the use of a Wheatstone bridge circuit including a variable resistance at the boiler, another variable resistance associated with the return line to the boiler, and a third variable resistance subject to outdoor temperatures, and by the use of alternating current on the bridge. According to a particular feature of the invention, the bridge circuit is always unbalanced in a certain direction, and means is employed to detect a change in the degree of unbalance produced by temperature changes to start or shut off the supply of heat.

The invention and further features thereof will be described hereinafter with reference to the accompanying drawing, which shows in diagrammatic form the apparatus and circuits involved.

It will be assumed for convenience that the invention is installed in connection with a well known type of hot water heating system comprising a boiler and radiators with a pump controlled by a room thermostat for circulating the water. There may also be a service water storage tank and a suitable known type of indirect heating unit for heating the service water from the boiler. The apparatus provided in accordance with the invention serves to maintain the temperature of the water in the boiler at a certain desired and predetermined value, modified, however, in accordance with the temperature of the water in the return system and the outside temperature. The heating system, being well known, is not shown herein.

Proceeding now with the description of the apparatus, there is shown at the left of the drawing a Wheatstone bridge circuit comprising the arms A, B, C, and D, and the bridged resistance 12. To the right of the bridge circuit there is shown what may be referred to as an amplifier circuit comprising the tubes 20 and 30 and the other circuit elements which are associated therewith. At the right of the amplifier circuit is a relay 35, the function of which is to start and stop the oil burner or other fuel consuming apparatus which heats the boiler. In the lower part of the drawing is shown a rectifier R for supplying the necessary direct current potentials which are required for the operation of the amplifier and the relay. Associated with the rectifier is a switch S by means of which the apparatus may be connected up to a source of commercial alternating current. All of this equipment, except certain resistances in the bridge arms which will be referred to particularly hereinafter, is preferably assembled in a suitable casing or cabinet and installed in some protected location convenient to the heating plant which it is to control.

Considering the bridge circuit more in detail, the arm A comprises a fixed resistance 2, an adjustable resistance or rheostat 3, and a variable resistance 4. The latter is protected in known manner so that it will not be damaged by the elements and is located outdoors at a suitable point where it will be exposed to normal outdoor temperatures. The arm B of the bridge comprises a fixed resistance 11 and an adjustable resistance or rheostat 10. The arm C comprises two fixed resistances 5 and 6. The arm D comprises a variable resistance 7, a fixed resistance 8, and another variable resistance 9. The resistance 7 is subject to temperature conditions at the boiler and is preferably immersed in the water, any well known type of construction being adopted which is suitable for this purpose. Resistance 9 may be similar in construction to resistance 7, but is immersed in the water at a suitable point in the return line to the boiler, where it is subject to temperature conditions in the water leaving the radiator system.

The resistances 4, 7, and 9 are of course made of material which has a high temperature coefficient, that is, a material whose resistance changes greatly in accordance with its temperature. All the other resistances and the rheostats 3 and 10 should be constructed of a material having a very low temperature coefficient, such as Advance wire. It is not essential that the resistances have any particular value so long as they are in the proper proportion. The resistance of the bridge arm C may be, for example, 10,000 ohms, and the total resistance of the bridge arm A, with the rheostat 3 short circuited by the switch S1, may be approximately the same, depending on the instant value of the resistance 4. This resistance may be 5000 ohms at 60° F., for instance, and the resistance 2 may be 5000 ohms. The rheostat 3 may have a range of from 0 to about 1000 ohms. The resistances 7 and 9 of the bridge arm D may have values of 4000 and 1000 ohms, respectively, at the temperature stated, and the resistance 8 may have a value of 1000 ohms. The total resistance of arm D, of course, is subject to change with changes in water temperature which affect the resistances 7 and 9. The resistance of arm B should be enough higher than the resistance of arm D so that the bridge will always be unbalanced in the same direction under any condition of outside temperature or water temperature that may ensue. Having regard to the values given for the resistances in the other bridge arms, the value of resistance 11 may be about 6000 ohms, and the range of the rheostat 10 may be from 0 to 5000 ohms. The resistance 12 in the bridge should be high, preferably about 100,000 ohms.

The switch S1 is provided for the purpose of changing over from daytime operation to operation at night, which usually involves the maintenance of a lower boiler temperature. This switch may be operated by hand or it may be operated automatically by means of a clock. Alternating current is supplied to the bridge circuit by means of a transformer 13, as shown in the drawing. When the switch S is closed, the primary winding of the transformer is connected to the commercial alternating current supply source. The transformer 13 is preferably a step down transformer having about a 2-to-1 ratio so that the voltage applied to the bridge will be in the neighborhood of 50 volts.

Passing on now to a consideration of the amplifier circuit, the tubes 20 and 30 may be double triode tubes of the type which is known as 6C8–G. Other types of tubes could be used, however. For instance, each of these double triodes could be replaced by two ordinary triodes.

The junction of the bridge arms A and C is connected over conductor 14 to the grid of the left-hand triode of tube 20. The cathode of the left-hand triode is connected to conductor 38, which is the negative bus-bar of the rectifier R, through the resistance 22. This resistance is shunted by the condenser 24 and constitutes the usual arrangement for giving the grid a negative bias with respect to the cathode while the tube is in operation. The junction of arms B and D of the bridge is connected by way of conductor 15 to the negative bus-bar 38. The plate of the left-hand triode is connected to the plus B bus-bar 39 through the resistor 21.

The plate circuit of the left-hand triode is coupled to the grid of the right-hand triode through the condenser 26. This grid is equipped with a grid leak 27. The cathode of the right-hand triode is connected to the bus-bar 38 through the resistor 23, which is shunted by the condenser 25. This arrangement constitutes a negative grid biasing circuit similar to the one already described in the case of the left-hand triode. It may be stated here that the two triode sections of tube 20 function as amplifiers.

The plate circuit of the right-hand triode of tube 20 extends to the plus B bus-bar 39 through the primary winding of the transformer 33. One terminal of the secondary winding is connected to the cathode of the left-hand triode of tube 30, and the other terminal of the secondary winding is connected to the plate through the resistance 31. The resistance 31 is a potentiometer having the movable arm 34 and is shunted by the condenser 32. The left-hand triode of tube 30 is in reality a diode, for the grid is connected directly to the plate. The cathode is connected to the negative bus-bar 38. The left-hand or diode section of tube 30 functions as a rectifier, to which power is supplied from the output of tube 20 through the transformer 33. The resistance 31 of the potentiometer is a load in the direct current circuit of the rectifier, and the movable arm 34 affords means by which a variable positive potential may be applied to the grid of the right-hand triode of tube 30.

The cathode of the right triode of tube 30 is connected to the negative bus-bar 38. The plate is connected to the plus B lead 39 through the relay 35 and the rheostat 47. Relay 35 may be of any suitable type and has a resistance of approximately 2500 ohms. It is shunted by condenser 48 to prevent chattering. The relay may have a single pair of contacts as shown, which are adapted to close a circuit over conductors 36 and 37 when the relay energizes. While the triode section of tube 30 operates satisfactorily as shown, provision may be made in known manner for placing a negative bias on the grid if desired.

The reference character R indicates a full wave rectifier of well known type, comprising the transformer 40 and the rectifier tube 45. The transformer 40 includes a primary winding 41 to which power is supplied from the source of commercial alternating current when the switch S is closed. The transformer also includes a secondary winding 42, the midpoint of which constitutes the negative terminal of the rectifier. The two outside terminals of this winding connect to the two plates of the rectifier tube, respectively. The transformer also includes a secondary winding 43 for supplying current to heat the cathode of the rectifier tube. One side of the cathode constitutes the positive terminal of the rectifier. In addition to the windings 42 and 43, there is a third winding 44 which supplies current to the heaters of tubes 20 and 30. It will be understood that these heaters, which are labeled X—X in the drawing, are connected to the winding 44. The output of the rectifier should be filtered in accordance with standard practice, as indicated in the drawing.

The apparatus having been described briefly, its operation now will be explained. For this purpose it will be assumed that the equipment is installed in the manner shown and described and that the switch S is closed. Alternating current is therefore supplied to the rectifier R, and to the bridge circuit through the transformer 13. Now, as previously mentioned, the bridge circuit is always unbalanced in the particular sense or direction such that the value of the fraction $$\frac{\text{arm B}}{\text{arm D}}$$

is greater than the value of the fraction $$\frac{\text{arm A}}{\text{arm C}}$$

the arms being considered in respect of their resistance values. This was explained in describing the apparatus, when it was pointed out that with arms A and C approximately equal, arm B should be enough higher in resistance than arm D to insure a permanent unbalance regardless of any possible changes in the variable resistances. It will be understood, therefore, that since the bridge is unbalanced, alternating current will flow in the resistor 12 and that alternating potentials will be applied to the conductors 14 and 15, due to the fall in potential across the resistor 12. These alternating potentials are applied to the grid cathode circuit of the left triode section of tube 20, and produce fluctuating currents in the plate circuit. The result is that the potential at the plate rises and falls, causing the condenser 26 to charge and discharge in series with the resistor 27. Alternating potentials are accordingly applied to the grid of the right triode section of tube 20, causing fluctuating potentials in the plate circuit including the primary winding of the transformer 33. In this manner the output of the bridge circuit is amplified by the two sections of tube 20 and a considerable amount of power may be delivered to the transformer 33. The power output from tube 20 is of course dependent upon the degree to which the bridge is unbalanced.

The fluctuating current in the primary winding of transformer 33 induces an alternating current in the secondary winding, which is rectified by the diode section of tube 30, and a pulsating direct current flow is produced in a circuit including the secondary winding of the transformer, the cathode of the left section of tube 30, the associated grid and plate, and the resistance 31 of the potentiometer. The pulsations are smoothed out to a certain extent by the condenser 32. The arm 34 of the potentiometer picks up a positive potential which varies in accordance with the amount of power being supplied and applies it to the grid of the right hand triode section of tube 30. This section operates as an amplifier. The plate circuit includes the relay 35, which is adjusted so that it will operate on a current of about 8 milliamperes and will fall back on a current of about 6 milliamperes. The desired operation of the amplifier circuit is secured by regulating the potentiometer 31 and the rheostat 47 so that with the minimum bridge circuit output the relay 35 will not energize.

Reverting now to the bridge circuit, rheostat 10 is so adjusted that with a given outside temperature and a certain corresponding value of resistance 4, and with a desired boiler and return water temperature, and corresponding values of resistances 7 and 9, the bridge circuit will only be unbalanced to a limited extent, so that the output from the bridge to the tube 20 will be so small that the resulting output at tube 30 will not be sufficient to operate relay 35. That is, the current in the plate circuit of the right triode of tube 30 will be less than 8 milliamperes. The rheostat 10 is used, therefore, to regulate or change the point at which the apparatus will function to start the heating apparatus in operation.

It may be assumed that the water temperature is for the time being above the lower limit for which the apparatus is set, and accordingly no heat is required and relay 35 is deenergized as shown in the drawing. Due to cooling of the water, however, the resistance of the bridge arm D will fall, thereby increasing the extent to which the bridge is unbalanced and correspondingly increasing the output from the bridge to the amplifier and the current flow through the relay 35. As soon as the resistance of arm D decreases below the limit for which the apparatus is adjusted, the current flow through relay 35 will be increased to the value required for operating it, and the relay will energize. On attracting its armature, relay 35 closes a circuit over conductors 36 and 37 which is effective to start up the heating apparatus. This heating apparatus may be an oil burner, an automatic stoker, or any desired form of heating apparatus capable of being controlled in the required manner. As the heating apparatus and the specific control circuit are well known, they are not shown in the drawing.

Responsive to the starting of the heating equipment, heat is supplied to the boiler and the temperature of the water in the boiler is raised gradually, thereby causing the resistance 7 to correspondingly increase in value. This has the effect of reducing the extent to which the bridge circuit is unbalanced and correspondingly reducing the output of the bridge and the amount of current supplied to relay 35. When this current falls below 6 milliamperes, the relay falls back and breaks the control circuit, thereby stopping the heating apparatus. The temperature of the water in the boiler may continue to rise for a time, particularly with certain types of heating systems, but this merely causes the bridge circuit to further approach a balanced condition. The temperature begins to fall after a short time; that is, the water cools off gradually, and eventually the same operations are repeated. The reason for having the bridge unbalanced normally is to eliminate any danger of the bridge passing through the balanced condition and becoming unbalanced in the opposite sense sufficient to operate the relay, which would lock the heating apparatus in permanently.

It will be observed that the effect of the resistance 7 which is subject to the temperature of the water in the boiler is modified by the effect of resistance 9 which is associated with the return line. For instance, if a considerable amount of heat is being given off by the radiator equipment, the water in the return line will be relatively cold, the value of resistance 9 will be relatively low, and resistance 7 will have to be raised to a higher value each time before the heat is shut off. This results in a somewhat higher boiler temperature, which is needed in order to take care of the assumed condition. On the other hand, if the water in the return line is warm, which means that less heat is being dissipated, the value of resistance 9 will be higher, and resistance 7 will not have to be raised to so high a value before the normal condition of the bridge is restored and the heat is shut off. The principal control, however, as regards arm D, is exercised by the resistance 7, and this resistance forms a much greater portion of the total resistance in arm D than does resistance 9. As pointed out before, the ratio may be as 4 is to 1.

The resistance 4 is provided to take care of changes in outside temperature and to automatically adjust the bridge circuit in accordance with the varying heat losses which take place as the result thereof. In particular, this resistance responds quickly to sudden changes in outside temperature and adjusts the bridge in anticipation of the altered heat requirements. It may be assumed, for instance, that while the apparatus is operating in normal fashion, as described, the outside temperature suddenly falls 10 or 15 degrees. This causes a considerable decrease in the value of resistance 4, which tends to unbalance the bridge in the same sense as a decrease in the value of resistance 7 in bridge arm D. If the heating apparatus is off, it will accordingly be started up sooner than would otherwise be the case, and the value of resistance 7 will have to be raised higher before the heat is shut off. The average boiler temperature is therefore raised in the required manner in order to provide the additional heat necessary to compensate for the increased heat losses.

When the outside temperature rises, the reverse action takes place, and the average boiler temperature is lowered correspondingly.

The foregoing explanation applies to the normal operation of the apparatus in the daytime. At night it is usually considered that the temperature can be allowed to fall, and the switch S1 is provided to readjust the bridge circuit so as to call for less heat. It will be seen that when the switch S1 is open, the total resistance of the bridge arm A is increased and that the effect is the same as though the value of resistance 4 were raised responsive to an increase in the outside temperature. The result is that resistance 7 does not have to be raised to so high a value to restore the normal minimum amount of unbalance in the bridge each time and that the temperature of the water in the boiler is held at a lower value. The resistance 3 is adjustable, that is, it is in the form of a rheostat, so that the differential between the boiler temperature at night and the boiler temperature at daytime may be adjusted as desired.

Further additions to the bridge circuit may be made if desired, to take care of differences between summer and winter operation, to adjust for the altitude of the location where the apparatus is installed, and for other varying conditions. Furthermore, the invention is not necessarily limited to the particular use specified herein, but the principles employed will be applicable to other situations, suitable modifications being made in the apparatus if necessary to adapt it to changed conditions. I do not therefore desire to be limited to the exact form of the invention shown and described herein, but desire to include and have protected by letters patent all forms and modifications of my invention which come within the scope of the appended claims.

I claim:

1. In a temperature control system, a Wheatstone bridge circuit having a variable resistance arm subject to changes in the temperature of the medium whose temperature is to be controlled, means for supplying alternating current to the bridge circuit, a resistance in the bridge through which current flows due to an unbalanced condition, means for amplifying the alternating potentials produced across said latter resistance, said amplifying means comprising a vacuum tube having its grid and cathode connected to opposite terminals of said bridge resistance, means for rectifying the amplifier output, and means controlled by the rectified output for controlling the supply of heat to said medium.

2. In a temperature control system, a Wheatstone bridge circuit, means for supplying alternating current to the bridge, circuit connections for taking off an alternating output from the bridge circuit depending in amount on the degree to which the bridge is unbalanced, means for adjusting one arm of the bridge so that a condition of unbalance always exists, a variable resistance included in another arm and subject to temperature changes at the point where the temperature is to be controlled, and means for utilizing the variable bridge output caused by changes in said variable resistance to control the supply of heat at said point.

3. In a temperature control system, a temperature control relay, means including a space discharge device and a source of direct current for operating said relay, a Wheatstone bridge, means for applying alternating current to said bridge, thereby producing an alternating output when the bridge is unbalanced, means including a rectifier for causing said output to control said space discharge device, and temperature responsive means adapted to effectively unbalance said bridge in one direction only.

4. In a control system, a Wheatstone bridge circuit means for supplying alternating current to said bridge circuit, an element included in one arm of said bridge circuit and subject to independent resistance variations, means for picking up alternating potentials produced in the bridge by an unbalanced condition of the bridge circuit, means for amplifying and rectifying said potentials to control the operation of a responsive device, and means adjusting said bridge circuit so that potentials sufficient to cause the response of said device are always produced by a resistance change in said element which unbalances the bridge circuit in a particular direction.

5. In a control system, a Wheatstone bridge circuit, means for supplying alternating current to said bridge circuit, an element included in one arm of said bridge circuit and subject to independent resistance variations, means for picking up alternating potentials produced in the bridge by an unbalanced condition of the bridge circuit, a control relay, means for causing said potentials to control the operation of said relay, and means adjusting said bridge so that throughout substantially the entire range of resistance variations of said element the bridge is unbalanced in the same sense and cannot be unbalanced sufficiently in the opposite sense to effect the operation of said relay.

6. In a control system, a Wheatstone bridge circuit, means for supplying alternating current to said bridge circuit, an element included in one arm of said bridge subject to independent resistance variations, a resistance included in another arm of said bridge circuit having a value such that throughout substantially the whole range of resistance variation of said element the bridge is unbalanced in a particular direction, means for picking up alternating potentials produced in the bridge by an unbalanced condition, and a marginal responsive device controlled by said potentials and so adjusted that it can respond only to potentials which can be produced when the bridge is unbalanced in said particular direction.

7. In a temperature control system, a Wheatstone bridge circuit having a variable resistance arm subject to changes in the temperature of the medium whose temperature is to be controlled, means for supplying alternating current to the bridge circuit, an amplifier responsive to alternating potentials produced by an unbalanced condition of said bridge circuit, means for rectifying the output of said amplifier, a marginal relay controlling the temperature of said medium, means for utilizing the rectified output of said amplifier to control said relay, and means adjusting said bridge circuit so that within the range of variation of said resistance arm the bridge can become sufficiently unbalanced in only one direction to effect the operation of said relay.

ALBERT W. KRAUSE.